J. P. HEDSTROM.
CARRIAGE RETURN MECHANISM FOR GANG SAW SHARPENERS.
APPLICATION FILED JULY 16, 1912.
1,060,758.
Patented May 6, 1913.
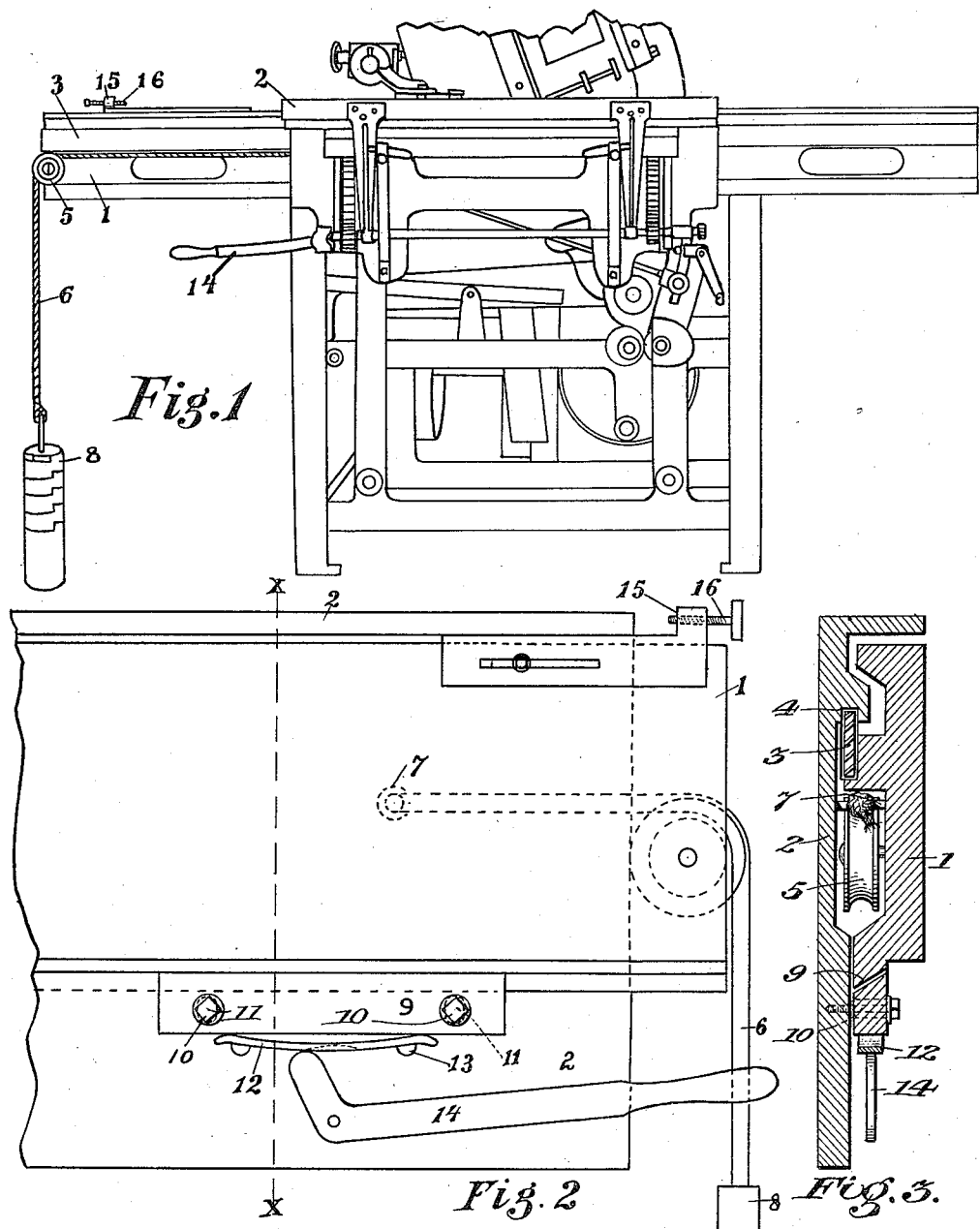

UNITED STATES PATENT OFFICE.

JOHN P. HEDSTROM, OF BIG RAPIDS, MICHIGAN.

CARRIAGE-RETURN MECHANISM FOR GANG-SAW SHARPENERS.

1,060,758.　　　　Specification of Letters Patent.　　Patented May 6, 1913.

Application filed July 16, 1912. Serial No. 709,669.

*To all whom it may concern:*

Be it known that I, JOHN P. HEDSTROM, a citizen of the United States, residing at Big Rapids, in the county of Mecosta and State of Michigan, have invented certain new and useful Improvements in Carriage-Return Mechanism for Gang-Saw Sharpeners; and I do hereby declare the following to be a full, clear, and exact description of the invention, such as will enable others skilled in the art to which it appertains to make and use the same.

This invention relates to gang saw sharpeners and the improvement pertains more particularly to that class of gang saw sharpeners in which the gang saw blade to be sharpened is clamped upon a reciprocating carriage, usually slidingly mounted upon a horizontal guide so that the saw blade is traversed horizontally past the grinding wheel of the machine to sharpen the teeth. Heretofore it has been customary in this class of machines to feed the carriage along its guide by intermittent step-by-step movement until the entire length of the saw has been acted upon by the grinding wheel, and then to return the carriage to its initial position, preparatory to the second grinding, by pulling the carriage back by hand. Since gang saws are sometimes as much as five feet in length and since the carriage is heavy, considerable strength was required to pull the carriage back to its initial position. Sometimes counterweights have been employed to facilitate drawing the carriage back, but it has been found in practice that considerable care on the part of the operator is required to prevent the speed of the carriage increasing as it moves back, striking the carriage stop a heavy blow that is liable to injure the machine or displace the setting of the saw.

It is the purpose of my present improvement to utilize the counter-weighted carriage but to provide means whereby the objections above noted are overcome, making it possible to return the carriage by merely touching a lever, and to check the movement of the carriage or stop it entirely by merely releasing the lever, so that in case of the operator accidentally letting go of the carriage while being retracted, the carriage will automatically stop instead of forcibly striking the end buffer.

A further object of my improvement is to enable the operator to readily move the carriage back nearly to its extreme position, then by merely releasing the lever to stop the movement of the carriage and subsequently to release it again so that the carriage will move slowly up to the buffer, where it stops, leaving the saw in proper position for the next grinding operation.

With these objects in view and certain others which will appear later in the specification, my improvement consists in the devices described and claimed and the equivalents thereof.

In the drawing, Figure 1 is a front elevation broken away in part, showing the front of a gang saw sharpening machine with my improvement attached; Fig. 2 is a rear view of one end of the carriage and guide, showing the improvement in place; and Fig. 3 is a vertical section taken on the line *x—x* of Fig. 2.

As is clearly shown in the drawings, the device consists in the usual stationary guide 1, upon which is slidingly mounted a carriage 2 to which the saw is clamped in the usual manner. The carriage 2 slides longitudinally upon the stationary guide 1, a track 3 being fixed to the guide for that purpose. A groove 4 is formed in the carriage 2 into which the track 3 is received. The carriage 2 is therefore suspended from the track 3.

A revolving sheave 5 is mounted upon the stationary guide 1, and a flexible cable 6 is secured at one end to a projection 7 carried by the carriage 2. The cable passes over the sheave and a counter-weight is suspended from the end of the cable, the weight being a little more than sufficient to overcome the frictional resistance of the carriage 2.

To check the movement of the carriage at any point, or to release the carriage to permit such movement, I provide a clamping gib 9, which is preferably mounted on the carriage 2 and traveling with it, the face of the gib passing lengthwise along one face of the stationary guide 1 as the carriage moves back and forth. The clamping gib is preferably mounted on the carriage so as to have a limited up-and-down movement, permitting it to be brought against or released from the corresponding face of the stationary guide, so as to act as a brake. Any desired means may be employed for holding the gib to the carriage, but I prefer to mount the gib on bolts 10 that pass through elongated holes 11 in the gib, so as to permit a limited free up-and-down movement on the bolts. To the underside of the clamping gib I prefer to apply a yielding spring 12 loosely secured at its ends by means of screws 13 or other suitable devices.

Upon the lower part of carriage 2 I pivot an L-shaped lever 14, the upper end of which is adapted to press against the underside of the yielding spring 12, the handle of the lever projecting approximately horizontally, as shown in Fig. 2. The weight of the handle is sufficient to press the spring 12 to clamp gib 9 against the face of the stationary guide with enough force to check the travel of the carriage, and when the handle is raised and the gib released, counterweight 8 draws the carriage back. It is only necessary for the operator to lift the handle and hold it in its raised position, and the carriage will travel back automatically. If the handle is released, the gib acts as a brake to check the travel of the carriage.

To limit the backward movement of the carriage and to stop it in the proper position for the grinding wheel to engage the first tooth of the saw, I provide the usual buffer comprising a bracket 15 carried by the stationary guide 1 and having an adjusting screw 16 mounted therein, against the end of which the end of the carriage may rest.

In practice the carriage is returned by first lifting the lever and allowing the carriage to run back nearly to the buffer. The lever is then released and the carriage is checked by the frictional engagement of the gib, the motion being checked without shock or jar, thus stopping the carriage near the buffer. The lever is then again lifted and the carriage moves slowly up to and stops against the buffer.

By the means above described I have produced a simple and effective device for controlling the return of the carriage, the device having the additional capacity of serving as a safeguard against jarring the machine by too rapid return of the carriage, since the handle, if suddenly released while the carriage is being returned, will automatically check its travel without shock.

Having described my invention, what I claim and desire to secure by Letters Patent, is:—

1. In a gang saw sharpener, the combination with the stationary guide, of a carriage slidingly mounted on said guide, a sheave carried by said guide, a flexible cable secured at one end to said sliding carriage, passing over said sheave and having a counterweight suspended from its end; a clamping gib loosely mounted on said carriage, said gib formed with elongated holes, bolts secured to said carriage and loosely received in said holes, a yielding spring secured to said gib, and a lever pivotally mounted on the carriage and adapted to normally press said spring.

2. In a saw sharpener, the combination with the stationary guide and the sliding carriage mounted thereon, of counter-balancing devices for retracting said carriage, a clamping gib loosely mounted on said carriage, and a lever pivotally mounted on said carriage and adapted to normally hold said gib in frictional engagement with said guide.

In testimony whereof, I affix my signature in presence of two witnesses.

JOHN P. HEDSTROM.

Witnesses:
   CHRISTINE A. BRAIDEL,
   NELLIE M. ANGUS.

---

Copies of this patent may be obtained for five cents each, by addressing the "Commissioner of Patents, Washington, D. C."